United States Patent
Cochran et al.

(10) Patent No.: US 9,531,302 B1
(45) Date of Patent: Dec. 27, 2016

(54) RACHETING MICROMOTOR USING BI-DIRECTIONAL ACTUATOR

(71) Applicants: Kevin Cochran, Falls Church, VA (US); Daniel Jean, Odenton, MD (US); Ezra Chen, Bowie, MD (US)

(72) Inventors: Kevin Cochran, Falls Church, VA (US); Daniel Jean, Odenton, MD (US); Ezra Chen, Bowie, MD (US)

(73) Assignee: The United States of America as Represented by the Secretary of the Navy, Washington, DC (US)

( * ) Notice: Subject to any disclaimer, the term of this patent is extended or adjusted under 35 U.S.C. 154(b) by 335 days.

(21) Appl. No.: 13/998,722

(22) Filed: Nov. 27, 2013

(51) Int. Cl.
| | |
|---|---|
| H02N 10/00 | (2006.01) |
| H02K 41/02 | (2006.01) |
| H02N 2/02 | (2006.01) |
| H02N 2/04 | (2006.01) |

(52) U.S. Cl.
CPC .............. H02N 2/021 (2013.01); H02N 2/043 (2013.01)

(58) Field of Classification Search
CPC ................................ H02N 2/021; H02N 2/043
USPC ........... 310/306, 300, 307, 309, 328, 15, 37, 310/12.01, 12.04, 12.07
See application file for complete search history.

(56) References Cited

U.S. PATENT DOCUMENTS

| | | | |
|---|---|---|---|
| 3,800,206 A * | 3/1974 | Hinachi | H02K 37/14 318/400.09 |
| 6,804,036 B1 * | 10/2004 | Chen | G02B 26/0841 359/237 |
| 6,853,765 B1 | 2/2005 | Cochran | |
| 7,274,842 B2 | 9/2007 | Gulvin et al. | |
| 7,552,681 B1 * | 6/2009 | Laib | F42C 15/005 102/233 |
| 7,567,011 B1 * | 7/2009 | Jean | F03G 7/06 310/300 |
| 7,692,127 B1 | 4/2010 | Linn et al. | |
| 7,714,691 B2 | 5/2010 | Zhu et al. | |
| 7,913,623 B1 * | 3/2011 | Fan | F42C 15/005 102/233 |
| 2005/0035687 A1 * | 2/2005 | Xu | H02N 2/101 310/328 |

* cited by examiner

Primary Examiner — Terrance Kenerly
Assistant Examiner — Ahmed Elnakib
(74) Attorney, Agent, or Firm — Fredric J. Zimmerman

(57) ABSTRACT

A ratcheting micromotor includes a ratchet bar defining ratchet teeth along an edge thereof, and first and second ends in opposition to one another. The first end is adapted to be coupled to an object to be moved. A spring is coupled on one end thereof to the second end of the ratchet bar and adapted to be fixed at another end thereof to a base. A bi-directional actuator configured for linear movement in one of a first direction and a second direction, and when energized has a common yoke coupled to a central portion thereof for movement in correspondence therewith. The common yoke includes teeth formed along an edge and positioned such that its teeth engage a portion of the ratchet teeth. A control system energizes the bi-directional actuator to move, alternately, in the first direction and the second direction.

7 Claims, 3 Drawing Sheets

RACHETING MICROMOTOR USING BI-DIRECTIONAL ACTUATOR

ORIGIN OF THE INVENTION

The invention described herein was made in the performance of official duties by employees of the Department of the Navy and may be manufactured, used, licensed by or for the Government for any governmental purpose without payment of any royalties thereon.

FIELD OF THE INVENTION

The invention relates generally to micromotors, and more particularly to a ratcheting micromotor driven by a bi-directional actuator.

BACKGROUND OF THE INVENTION

Microelectromechanical Systems (MEMS) are miniaturized devices (micron dimensions) that consist of actuators, sensors, and other mechanical structures. Typical MEMS actuators may be electrostatic, magnetic, or thermal. Thermal actuators may further be classified as v-beam, u-beam, or bimorph types. They are typically fabricated by bulk-etching a silicon substrate or depositing layers of polysilicon, oxides, metals, etc. on top of a silicon substrate. All three types of thermal actuators are traditionally designed to displace in only one in-plane direction due to design or fabrication limitations or the desire for device design simplicity. If multi-directional displacement is required, a single actuator for each displacement direction is required. While multi-directional u-beam type actuators have been documented, these actuators are limited because their motion is in an arc, rather than a line, and their maximum displacement is typically limited.

SUMMARY OF THE INVENTION

Accordingly, it is an object of the present invention to provide a linear-motion micromotor.

Another object of the present invention is to provide a ratcheting micromotor that produces work in a linear direction.

Other objects and advantages of the present invention will become more obvious hereinafter in the specification and drawings.

In accordance with the present invention, a ratcheting micromotor includes a ratchet bar defining ratchet teeth along an edge thereof. The ratchet bar has a first end and a second end in opposition to the first end. The first end is adapted to be coupled to an object to be moved. A spring is coupled on one end thereof to the second end of the ratchet bar and is adapted to be fixed at another end thereof to a base. A bi-directional actuator configured for linear movement in one of a first direction and a second direction, and when energized has a common yoke coupled to a central portion thereof for movement in correspondence therewith. The common yoke has teeth formed along an edge thereof and is positioned such that the teeth thereof engage a portion of the ratchet teeth. A control system coupled to the bi-directional actuator energizes the bi-directional actuator such that it may alternately move in the first direction and the second direction.

BRIEF DESCRIPTION OF THE DRAWINGS

Other objects, features and advantages of the present invention will become apparent upon reference to the following description of the exemplary embodiments and to the drawings, wherein corresponding reference characters indicate corresponding parts throughout the several views of the drawings and wherein.

DETAILED DESCRIPTION OF THE INVENTION

Figure 1:
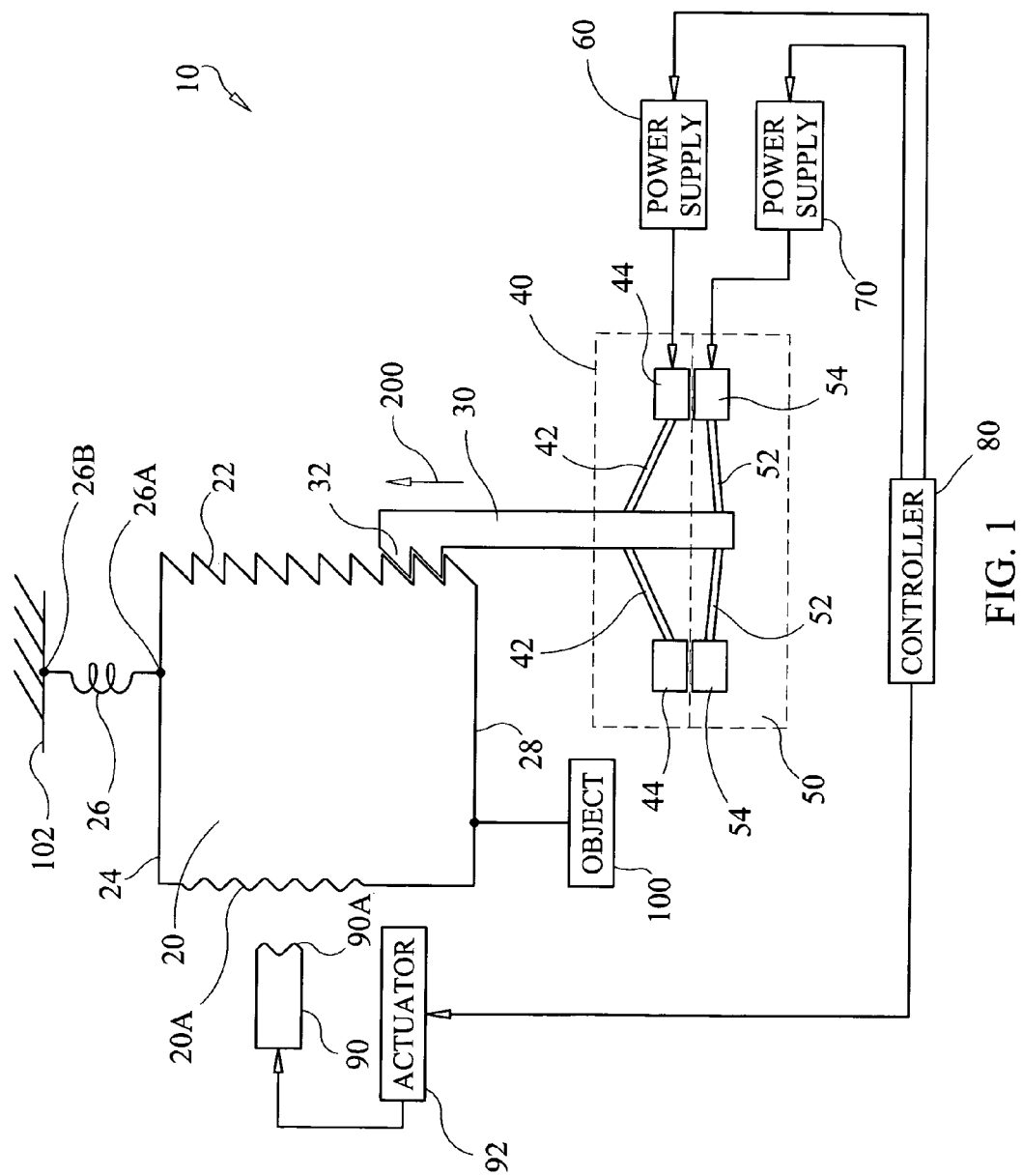
FIG. 1 is a schematic view of a ratcheting micromotor to include a bi-directional actuator energized to a first displaced position for initial engagement with the micromotor's ratcheting bar in accordance with an embodiment of the present invention.

Referring now to the drawings and more particularly to FIG. 1, a ratcheting micromotor to include a bi-directional actuator in accordance with an embodiment of the present invention is shown and is referenced generally by numeral 10. The structural elements of micromotor 10 will be described with the aid of FIG. 1. Subsequently, FIGS. 1-3 will be used to describe an operational cycle of micromotor 10. In general, micromotor 10 is constructed as a MEMS device in accordance with fabrication techniques well understood in the art. The particular fabrication details of micromotor 10 are not limitations on the present invention. Further, the shape and relative sizes of the micromotor's elements illustrated herein are not limitations of the present invention and only for purpose of description and ease of illustration. The micromotor 10 is generally fabricated by bulk-etching a silicon substrate or depositing layers of polysilicon, oxides, metals, etc. on top of a silicon substrate.

Micromotor 10 uses ratchet action between two of its elements to apply "work" (i.e., move) to an object 100. More specifically, micromotor 10 includes a ratchet bar 20 with ratchet teeth 22 defined along a longitudinal edge thereof that engage with teeth 32 formed on a yoke 30. As will be explained later herein, yoke 30 is moved/displaced in two opposing linear directions during a motor cycle where one direction moves ratchet bar 20 and the other direction resets yoke 30 for the next motorcycle.

Ratchet bar 20 is generally an elongate rigid member whose ratchet teeth 22 are defined along part or all of a longitudinal side thereof. One axial end 24 of ratchet bar 20 is coupled to a spring 26 at its end 26A with spring 26 being fixed at its other end 26B to a base 102. Note that the spring (or springs) could also be placed on the side of ratchet bar 20 without departing from the scope of the present invention. The other axial end 28 of ratchet bar 20 is coupled to object 100. The length of ratchet bar 20 and/or number of ratchet teeth 22 may be selected and predicated on the needs of a particular application and, therefore, do not limit the scope of the present invention.

Yoke 30 is generally an elongate rigid member whose teeth 32 are defined along a longitudinal edge thereof. While two teeth 32 are shown in the exemplary figures, it is to be understood that more or fewer teeth 32 may be provided without departing from the scope of the present invention. Teeth 32 are configured as ratchet teeth such that they may slide over ratchet teeth 22 when yoke 30 moves in one-direction, but will engage (i.e., lock with) ratchet teeth 22 when yoke 30 moves in an opposing direction. The design of such ratchet teeth for relative movement and (locked) engagement is well understood in the art.

Movement of yoke 30 is governed by a bi-directional actuator coupled thereto. In the illustrated embodiment, the bi-directional actuator is defined by a first v-beam actuator 40 and a second v-beam actuator 50. Each of actuators 40 and 50 is a thermal actuator that is configured to produce one-directional linear motion when energized. For example, actuator 40 includes two identical-length beams or "legs" 42 fixedly coupled on one end to yoke 30 and clamped at their other ends to anchors 44. Multiple parallel beams may be used for each leg of the actuator to increase the generated force without departing from the scope of the present invention. Beams 42 are coupled to yoke 30 at an offset position such that yoke 30 will be driven in the direction of the offset position when actuator 40 is energized (i.e., beams 42 are elongated). In other words, beams 42 define a v-beam with yoke 30 being coupled to a central portion thereof. A similar construction is used for actuator 50 except that beams 52 are coupled to yoke 30 at an offset position such that yoke 30 will be driven in a direction opposite of the one cause when actuator 50 is energized. As will be explained further below, FIG. 1 shows beams 42 in an energized/elongated state and beams 52 in a non-energized/shrink state. This configuration may represent the default state of micromotor 10.

The opposing-direction linear motion of yoke 30 via actuators 40 and 50 is made possible by a control system that alternately energizes actuators 40 and 50. In the illustrated embodiment, a power supply 60 is electrically coupled to actuator 40, e.g., coupling to beams 42 via anchors 44 (for clarity of illustration only coupling to one anchor 44 is shown). A second power supply 70 is electrically coupled to actuator 50 via its anchor 54. A controller 80 is coupled to power supplies 60 and 70.

As will be explained further below, ratchet bar 20 may be subject to axial movement during the reset portion of a motor cycle due to the forces of spring 26.

Accordingly, it may be desirable to provide a retainer or stabilizer to prevent any axial movement of ratchet bar 20 during the reset cycle of micromotor 10. By way of example, a movable retainer/stabilizer 90 is provided adjacent to the longitudinal side of ratchet bar 20 that opposes the longitudinal side with ratchet teeth 22. Retainer/stabilizer 90 and the side of ratchet bar 20, which it opposes, may define teeth 90A and 20A, respectively. Movement of retainer/stabilizer 90 between a position of (toothed) engagement with ratchet bar 20 (FIG. 3) and disengagement with ratchet bar 20 (FIG. 2) is governed by an actuator 92 coupled thereto. Control of actuator 92 may be governed/synchronized by the controller 80.

Figure 2:
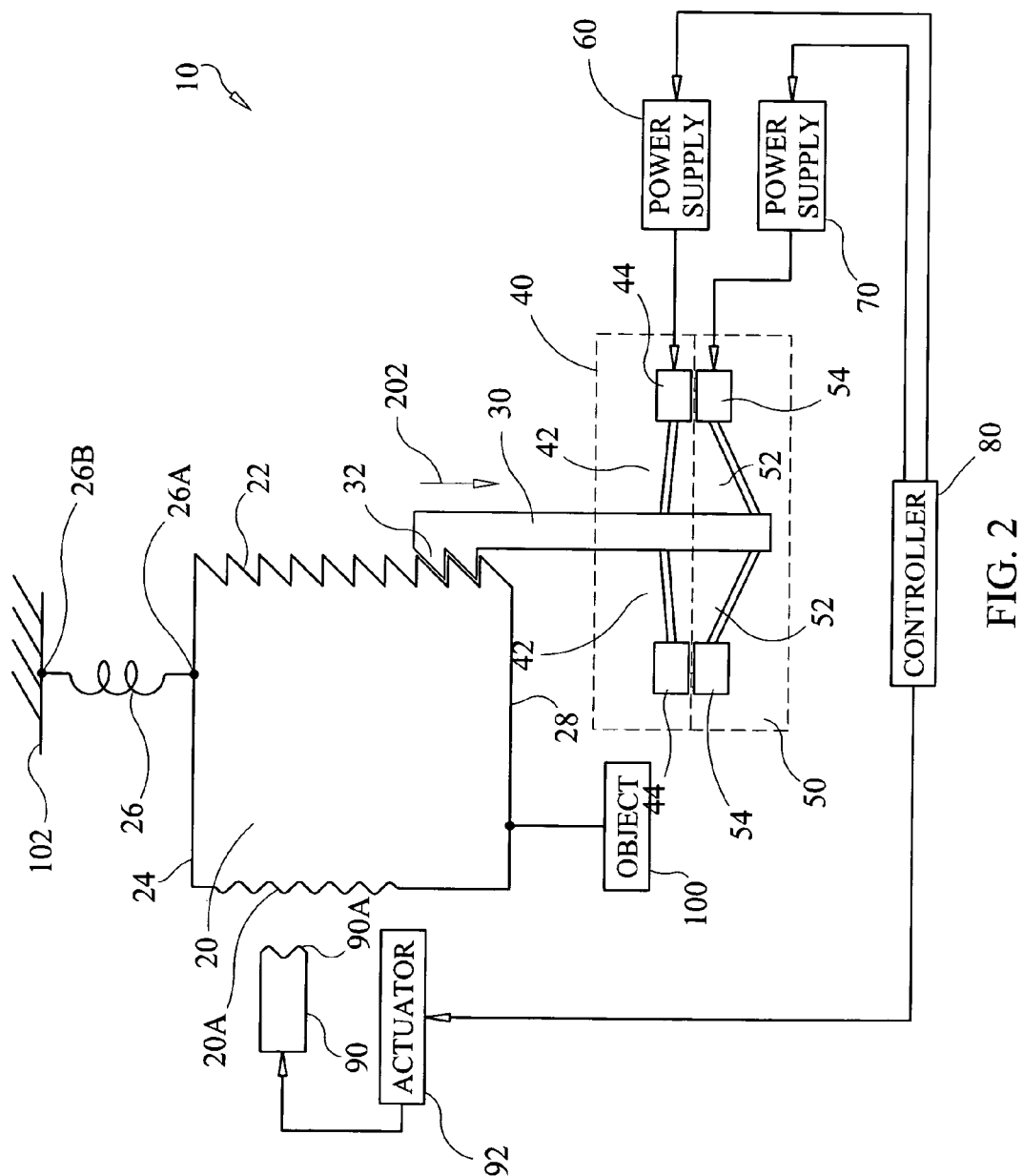
FIG. 2 is a schematic view of the ratcheting micromotor with its bi-directional actuator energized to its second displaced position.
Figure 3:
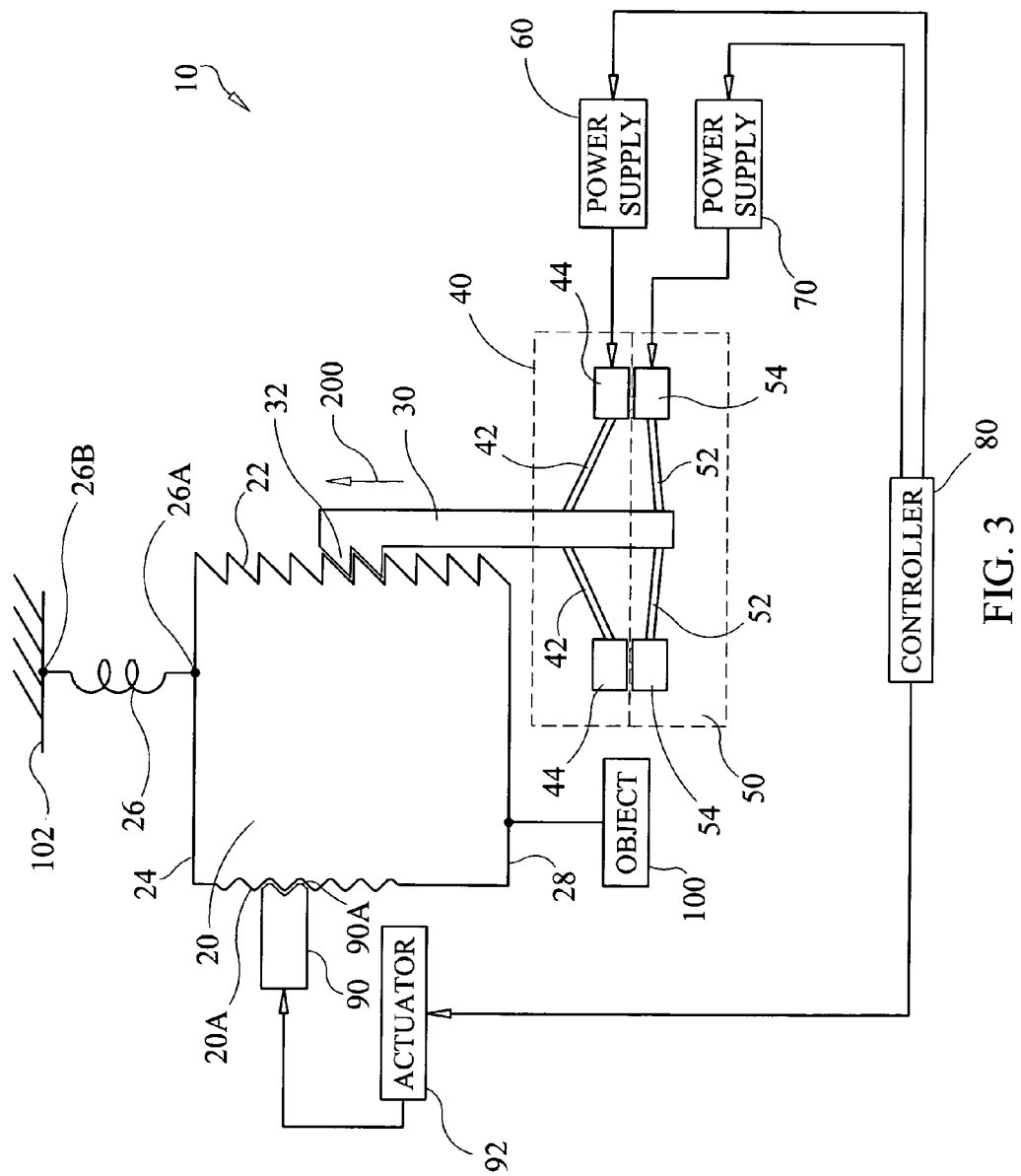
FIG. 3 is a schematic view of the ratcheting micromotor with its bi-directional actuator energized for a reset to its first displaced position.

A motor cycle of micromotor 10 will be described with reference to FIGS. 1-3. To begin the exemplary cycle, yoke 30 is moved in a linear direction 200 such that teeth 32 can engage ratchet teeth 22. (Note that this step may not be required if teeth 22/32 are already engaged, for example, during the fabrication of micromotor 10.) Accordingly, controller 80 activates only power supply 60 to thereby energize actuator 40 causing elongation of offset beams 42 while offset beams 52 remain in a non-energized (cool) state. To facilitate the sliding motion of teeth 32 relative to ratchet teeth 22, ratchet bar 20 and/or yoke 30 deflect slightly off axis as yoke 30 is moved in direction 200. Such off-axis motion is provided by the combination of spring suspension of ratchet bar 20, the cantilevered nature of yoke 30, and the asymmetrical design of teeth 22/32 as shown. Once yoke 30 has moved its maximum displacement in direction 200, the second half of the cycle of the micromotor 10 begins.

To perform work and move object 100, power supply 60 is deactivated while power supply 70 is activated. This scenario is illustrated in FIG. 2 where offset beams 42 are allowed to cool whereas offset beams 52 are heated/elongated to drive yoke 30 in an opposing linear direction 202. In this direction, ratchet teeth 22 and teeth 32 are in locked engagement with one another so that ratchet bar 20 is pulled against the force of spring 26 and object 100 is moved. Note that the locked engagement between ratchet teeth 32 and teeth 22 means that retainer/stabilizer 90 may remain disengaged from ratchet bar 20.

Once yoke 30 has reached its full displacement in direction 202, micromotor 10 must be reset to its earlier displacement shown in FIG. 1. To assure that ratchet bar 20 does not move axially as offset beams 42 are energized and offset beams 52 are not energized, retainer/stabilizer 90 is moved into engagement with the backside longitudinal edge of ratchet bar 20 as illustrated in FIG. 3. In this way, as yoke 30 again moves in direction 200, ratchet bar 20 stays in place as yoke 30 moves in direction 200.

The advantages of the present invention are numerous. The bi-directional actuator is a compact design that increases the amount of displacement/work provided during each operational cycle.

Although the invention has been described relative to a specific embodiment thereof, there are numerous variations and modifications that will be readily apparent to those skilled in the art in light of the above teachings. It is therefore to be understood that, within the scope of the appended claims, the invention may be practiced other than as specifically described.

Finally, any numerical parameters set forth in the specification and attached claims are approximations (for example, by using the term "about") that may vary depending upon the desired properties sought to be obtained by the present invention. At the very least, and not as an attempt to limit the application of the doctrine of equivalents to the scope of the claims, each numerical parameter should be at least construed in light of the number of significant digits and by applying ordinary rounding.

What is claimed as new and desired to be secured by Letters Patent of the United States is:

1. A ratcheting micromotor, comprising:
   a ratchet bar defining ratchet teeth along an edge thereof, said ratchet bar includes a first end and a second end in opposition to said first end, said first end adapted to be coupled to an object to be moved;
   a spring being coupled on one end thereof to said second end of said ratchet bar and being adapted to be fixed at an another end thereof to a base;
   a first v-beam actuator being configured for linear movement in a first direction when energized;
   a second v-beam actuator being configured for linear movement in a second direction when energized;
   a common yoke being coupled to a central portion of said first v-beam actuator and a central portion of said second v-beam actuator,
      wherein said common yoke moves in correspondence with said first v-beam actuator and said second v-beam actuator,
      wherein said first direction and said second direction are in opposition to one another,
      wherein said common yoke includes teeth formed along an edge thereof, and wherein said common yoke positioned such that
said teeth thereof engage a portion of said ratchet teeth; and
a control system being coupled to said first v-beam actuator and said second v-beam actuator where the control system alternately energizes said first v-beam actuator and said second v-beam actuator,
wherein the ratcheting micromotor is constructed as a micro-electrical-mechanical systems (MEMS) ratcheting micromotor device, which cycles in two directions due to the linear movement of the first v-beam actuator and the second v-beam actuator where the first v-beam actuator is substantially adjacent the second v-beam actuator.

2. The ratcheting micromotor as in claim 1, wherein said control system includes a first power supply coupled to said first v-beam actuator, and a second power supply coupled to said second v-beam actuator.

3. The ratcheting micromotor as in claim 1, wherein said ratchet teeth and said teeth on said common yoke are configured for relative movement when said common yoke moves in said first direction and for fixed engagement with one another when said common yoke moves in said second direction.

4. The ratcheting micromotor as in claim 3, further comprising a stabilizer and a third actuator, wherein said control system governs the third actuator and wherein the third actuator is coupled to the stabilizer positioned to engage said ratchet bar when said common yoke moves in said first direction.

5. A ratcheting micromotor, comprising:
a ratchet bar defining ratchet teeth along a first longitudinal edge thereof and having a second longitudinal edge opposing said first longitudinal edge, said ratchet bar includes a first axial end and a second axial end in opposition to said first axial end, said first axial end adapted to be coupled to an object to be moved;
a spring being coupled on one end thereof to said second axial end of said ratchet bar and being adapted to be fixed at an another end thereof to a base;
a movable retainer being positioned adjacent said second longitudinal edge of said ratchet bar between said first axial end and said second axial end thereof;
a first v-beam actuator being configured for linear movement in a first direction when energized;
a second v-beam actuator being configured for linear movement in a second direction when energized;
a common yoke being coupled to a central portion of said first v-beam actuator and a central portion of said second v-beam actuator,
wherein said common yoke moves in correspondence with said first v-beam actuator and said second v-beam actuator,
wherein said first direction and said second direction are in opposition to one another,
wherein said common yoke includes teeth formed along an edge thereof, and
wherein said common yoke is positioned such that said teeth thereof engage a portion of said ratchet teeth; and
a control system being coupled to said first v-beam actuator and said second v-beam actuator where the control system alternately energizes said first v-beam actuator and said second v-beam actuator,
wherein said control system further coupled to said movable retainer for movement thereof between a first position and a second position,
wherein, in said first position, said movable retainer permits movement of said ratchet bar,
wherein, in said second position, said movable retainer restricts movement of said ratchet bar, and
wherein the ratcheting micromotor is constructed as a micro-electrical mechanical systems (MEMS) ratcheting micromotor device, which cycles in two directions due to the movement of the first v-beam actuator and the second v-beam actuator where the first v-beam actuator is substantially adjacent the second v-beam actuator.

6. The ratcheting micromotor as in claim 5, wherein said control system includes a first power supply coupled to said first v-beam actuator, and a second power supply coupled to said second v-beam actuator.

7. The ratcheting micromotor as in claim 5, wherein said ratchet teeth and said teeth on said common yoke are configured for relative movement when said common yoke moves in said first direction and for fixed engagement with one another when said common yoke moves in said second direction.

* * * * *